US011044105B2

(12) United States Patent
Matovsky et al.

(10) Patent No.: US 11,044,105 B2
(45) Date of Patent: Jun. 22, 2021

(54) SYSTEM, METHOD, AND COMPUTER PROGRAM PRODUCT FOR SENSITIVE DATA RECOVERY IN HIGH SECURITY SYSTEMS

(71) Applicant: Dark Matter L.L.C., Dubai (AE)

(72) Inventors: Michael Matovsky, Vaughan (CA); Ravi Singh, Toronto (CA); Alexander Sherkin, Vaughan (CA)

(73) Assignee: DIGITAL 14 LLC, Abu Dhabi (AE)

( * ) Notice: Subject to any disclaimer, the term of this patent is extended or adjusted under 35 U.S.C. 154(b) by 271 days.

(21) Appl. No.: 16/352,482

(22) Filed: Mar. 13, 2019

(65) Prior Publication Data

US 2020/0295950 A1 Sep. 17, 2020

(51) Int. Cl.
*H04L 29/06* (2006.01)
*H04L 9/32* (2006.01)
*H04L 9/00* (2006.01)

(52) U.S. Cl.
CPC .......... *H04L 9/3268* (2013.01); *H04L 9/006* (2013.01); *H04L 9/321* (2013.01); *H04L 9/3247* (2013.01)

(58) Field of Classification Search
CPC ....... H04L 9/3268; H04L 9/006; H04L 9/321; H04L 9/3247
See application file for complete search history.

(56) References Cited

U.S. PATENT DOCUMENTS

| | | | |
|---|---|---|---|
| 2013/0179352 A1* | 7/2013 | Dwyre | G06Q 20/327 705/71 |
| 2014/0032924 A1* | 1/2014 | Durham | G06F 21/10 713/186 |

(Continued)

*Primary Examiner* — Ghodrat Jamshidi
(74) *Attorney, Agent, or Firm* — Zilka-Kotab, P.C.

(57) ABSTRACT

A system, method, and computer program product are provided for sensitive data recovery in high security systems. In operation, a client device receives a request by a user to initiate a data recovery process to recover data that is encrypted. The client device generates a new data recovery request key pair. The client device creates a data recovery request that includes a data recovery request public key. The client device signs the data recovery request using an identity private key that is associated with a certificate issued by a certification authority (CA). The client device sends the data recovery request to a server system storing the data. The server system accesses an offline data recovery subsystem (ODRS) storing a data recovery key pair to authenticate the user. The ODRS generates and stores a secret data recovery code. The client device receives the secret data recovery code that was communicated to the user. The client device sends the secret data recovery code along with the data recovery request to the server system. The server system verifies the received secret data recovery code against the stored secret data recovery code. The server system verifies a public key associated with the received data recovery request against a public key associated with a stored recovery request. The server system identifies the data recovery request as authenticated. The ODRS verifies a request signature associated with the data recovery request. The ODRS verifies the encrypted signature against encrypted and signed recovery data. The ODRS verifies that a user ID in a password reset request matches a user ID in a message encryption key signature. The ODRS decrypts the data recovery key pair and re-encrypts the data recovery key pair to the data recovery request public key. The ODRS stores the re-encrypted data recovery key pair associated with the data recovery request. The client device queries the server system to obtain the data. The server system returns the data to the client device. The client device decrypts the data using a data recovery private key.

20 Claims, 7 Drawing Sheets

(56) References Cited

U.S. PATENT DOCUMENTS

| | | | |
|---|---|---|---|
| 2015/0222435 A1* | 8/2015 | Lea | H04L 63/0823 |
| | | | 713/155 |
| 2015/0372811 A1* | 12/2015 | Le Saint | G06Q 20/3829 |
| | | | 705/76 |
| 2016/0065370 A1* | 3/2016 | Le Saint | H04L 9/14 |
| | | | 713/155 |
| 2016/0335625 A1* | 11/2016 | Ko | G06Q 20/326 |
| 2016/0352524 A1* | 12/2016 | Kinney | H04L 63/083 |
| 2019/0114631 A1* | 4/2019 | Madhu | G06Q 20/38215 |
| 2019/0122202 A1* | 4/2019 | Sun | G06Q 20/3829 |
| 2020/0279270 A1* | 9/2020 | Lieberman | G06K 9/00926 |

* cited by examiner

SYSTEM, METHOD, AND COMPUTER PROGRAM PRODUCT FOR SENSITIVE DATA RECOVERY IN HIGH SECURITY SYSTEMS

FIELD OF THE INVENTION

The present invention relates to securing sensitive data stored in systems, and more particularly to sensitive data recovery in high security systems.

BACKGROUND

In high security systems, highly sensitive user data stored on a server could be protected with a user's secret so that user data cannot be recovered from the server by an attacker if the server is compromised (e.g. by an attacker injecting malicious code exploiting an arbitrary code execution vulnerability, etc.). The user secret may be derived from the user password using a key derivation function (KDF). Alternatively, a user secret may be randomly generated and stored on the user's device. However, if a user forgets the password or loses the secret encryption key, the data will be lost, potentially resulting in significant user experience implications.

There is thus a need for addressing these and/or other issues associated with the prior art.

SUMMARY

A system, method, and computer program product are provided for sensitive data recovery in high security systems. In operation, a client device receives a request by a user to initiate a data recovery process to recover data that is encrypted. The client device generates a new data recovery request key pair. The client device creates a data recovery request that includes a data recovery request public key. The client device signs the data recovery request using an identity private key that is associated with a certificate issued by a certification authority (CA). The client device sends the data recovery request to a server system storing the data. The server system accesses an offline data recovery subsystem (ODRS) storing a data recovery key pair to authenticate the user. The ODRS generates and stores a secret data recovery code. The client device receives the secret data recovery code that was communicated to the user. The client device sends the secret data recovery code along with the data recovery request to the server system. The server system verifies the received secret data recovery code against the stored secret data recovery code. The server system verifies a public key associated with the received data recovery request against a public key associated with a stored recovery request. The server system identifies the data recovery request as authenticated. The ODRS verifies a request signature associated with the data recovery request. The ODRS verifies the encrypted signature against encrypted and signed recovery data. The ODRS verifies that a user ID in a password reset request matches a user ID in a message encryption key signature. The ODRS decrypts the data recovery key pair and re-encrypts the data recovery key pair to the data recovery request public key. The ODRS stores the re-encrypted data recovery key pair associated with the data recovery request. The client device queries the server system to obtain the data. The server system returns the data to the client device. The client device decrypts the data using a data recovery private key.

DETAILED DESCRIPTION

Figure 1A:
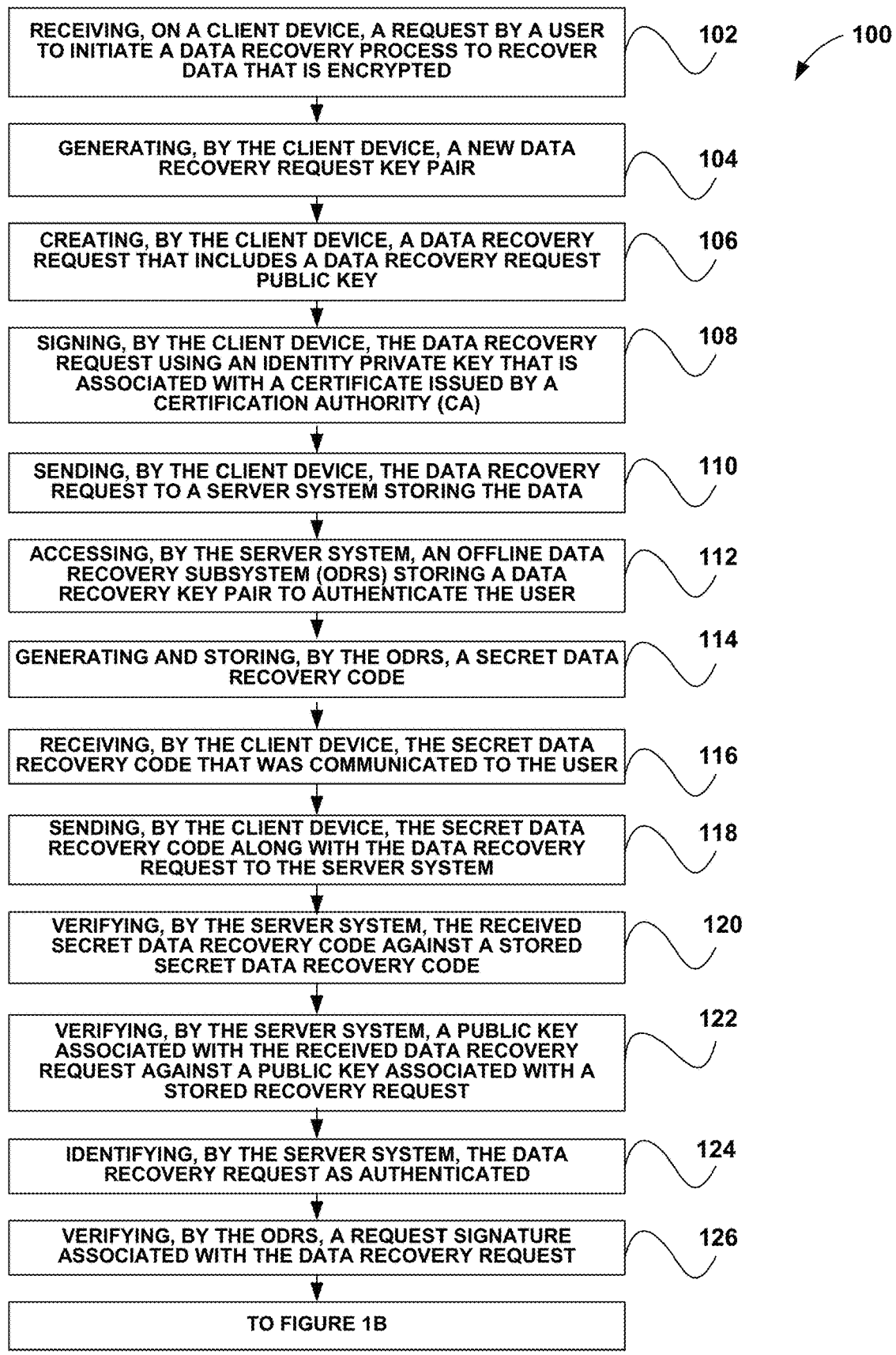
FIGS. 1A-1B show a method for sensitive data recovery in high security systems, in accordance with one embodiment.
Figure 1B:
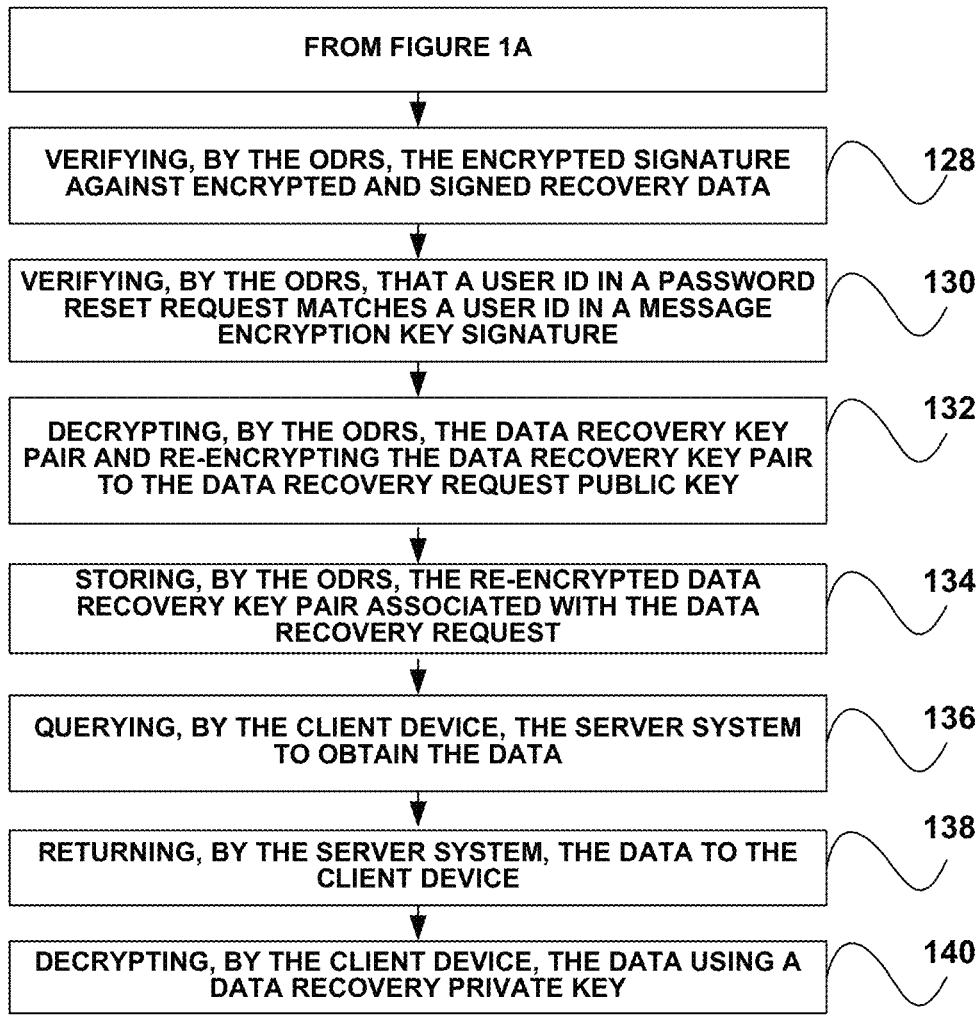

FIGS. 1A-1B show a method 100 for sensitive data recovery in high security systems, in accordance with one embodiment.

In operation, a client device receives a request by a user to initiate a data recovery process to recover data that is encrypted. See operation 102. The client device may include any device on which a user can access data, such as a computer (e.g. tablet, laptop, desktop, etc.), a mobile phone, a gaming device, etc.

The client device generates a new data recovery request key pair. See operation 104. The client device creates a data recovery request that includes a data recovery request public key. See operation 106.

The client device signs the data recovery request using an identity private key that is associated with a certificate issued by a certification authority (CA). See operation 108. The certificate issued by the certification authority may include a public key infrastructure (PKI) certificate, etc.

The client device sends the data recovery request to a server system storing the data. See operation 110. The server system accesses an offline data recovery subsystem (ODRS) storing a data recovery key pair to authenticate the user. See operation 112. The ODRS may not be connected to the Internet or any other network.

The ODRS generates and stores a secret data recovery code. See operation 114. The client device receives the secret data recovery code that was communicated to the user. See operation 116.

The client device sends the secret data recovery code along with the data recovery request to the server system. See operation 118. The server system verifies the received secret data recovery code against the stored secret data recovery code. See operation 120.

The server system verifies a public key associated with the received data recovery request against a public key associated with a stored recovery request. See operation 122. The server system identifies the data recovery request as authenticated. See operation 124.

The ODRS verifies a request signature associated with the data recovery request. See operation 126. The ODRS verifies the encrypted signature against encrypted and signed recovery data. See operation 128. The ODRS verifies that a user ID in a password reset request matches a user ID in a message encryption key signature. See operation 130. The ODRS decrypts the data recovery key pair and re-encrypts the data recovery key pair to the data recovery request public key. See operation 132. The ODRS stores the re-encrypted data recovery key pair associated with the data recovery request. See operation 134.

In one embodiment, the ODRS may include and utilize a hardware security module (HSM) to perform one or more operations. For example, the ODRS may utilize a hardware security module for verifying the request signature associated with the data recovery request. As another example, the ODRS may utilize a hardware security module for verifying the encrypted signature against the encrypted and signed recovery data. Of course, in various embodiments, the ODRS may utilize a hardware security module to perform various other operations, etc.

The client device queries the server system to obtain the data. See operation 136. The server system returns the data to the client device. See operation 138. The client device decrypts the data using a data recovery private key. See operation 140. The user may then choose a new password utilizing the client device that will protect the data after the data has been recovered. Alternatively or additionally, the user may generate a new data protection secret utilizing the client device that will protect the data after the data has been recovered.

It should be noted that the method 100 may be implemented utilizing various systems, hardware, software, applications, user interfaces, etc., as dictated by the implementer. For example, the systems/subsystems implementing the method 100 may include one or more processors, databases, etc., as well as implement various logic, computer code, applications, and/or user interfaces, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
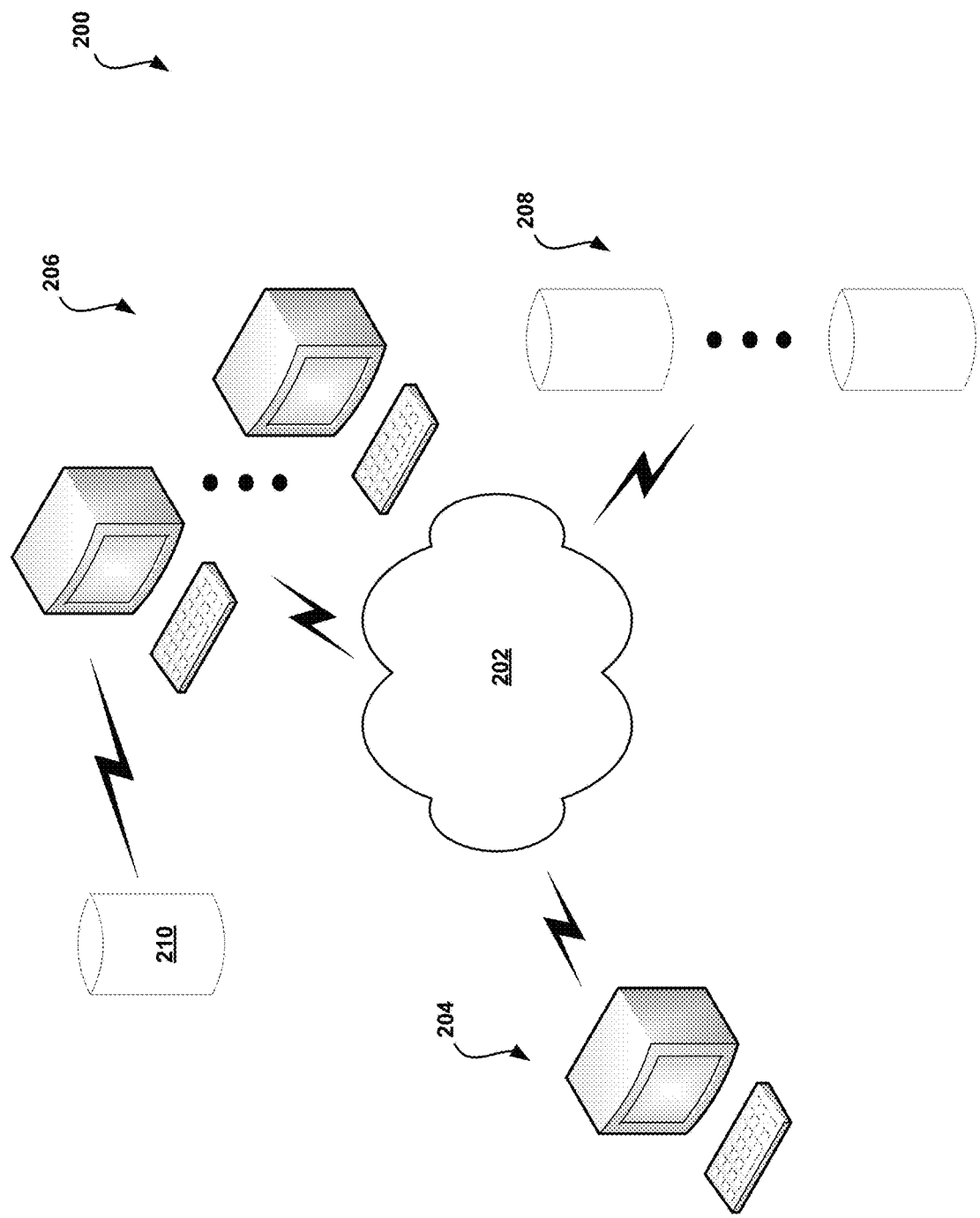
FIG. 2 shows a system for sensitive data recovery in high security systems, in accordance with one embodiment.

FIG. 2 shows a system 200 for sensitive data recovery in high security systems, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the system 200 includes a client system 204, which may implement a variety of applications or software, etc. The client system 204 may be capable of communicating with a plurality of systems 206, either directly or over one or more networks 202, for performing sensitive data recovery in high security systems. The client system 204 may also be in communication with one or more repositories/databases 208.

In high security systems, highly sensitive user data stored on a server could be protected with a user's secret so that user data cannot be recovered from the server by an attacker if the server is compromised (e.g. by an attacker injecting malicious code exploiting an arbitrary code execution vulnerability, etc.). The user secret may be derived from the user password using a key derivation function (KDF). Alternatively, a user secret may be randomly generated and stored on the user's device. However, if a user forgets the password or loses the secret encryption key, the data will be lost, potentially resulting in significant user experience implications.

Traditionally, a password reset procedure relies on alternative user authentication methods such as sending a password reset code to the user via email, SMS, traditional mail, etc. Once a password reset code is provided to the system, the system allows the user to choose a new password to unlock the account. However, if a server hosts data that is encrypted by the user password or a user secret key, it is not clear how this data may be recovered using traditional techniques.

In the solution described herein (and implemented by the system 200), the user has a private key associated with a certificate issued by the system public key infrastructure. The system 200 may include an offline data recovery subsystem (ODRS) 210 that has access to a data recovery key pair. Preferably, the ODRS is not connected to the Internet or even a corporate network. However, the ODRS should have access to the server database. The ODRS is configured with PKI trust information (e.g. a CA certificate, etc.).

During user registration with the system process implemented by the system 204, the user encodes data the user may want to recover including any keys the user may need to recover in the future. This data may be referred to as "recovery data". Typically, recovery data should not be particularly long because recovery data may include the keys (secret and/or private keys) that encrypt the data as opposed to the actual data. Recovery data is then encrypted with the data recovery public key. Encrypted recovery data is then signed by the user identity private key. Encrypted and signed recovery data is then sent to a server where it is stored (e.g. one of the systems 206, etc.)

Any time a user wants to change the recovery data, the user updates the recovery data and the system 204 re-encrypts the recovery data with the data recovery public key, and re-sends the data to the server. The server cannot access recovery data because it does not have access to the data recovery private key.

Also, even if malicious code is injected into the server, this malicious code will not be able to access the recovery data. The system that has access to the data recovery private key is the ODRS, which is an offline system that may also have enhanced physical protections.

If a user forgets a password or loses a data protection secret (stored on the client), the user may initiate the data recovery process that will recover the recovery data. Typically, sensitive data is not protected by the password or data protection secret directly, but instead data is encrypted by an intermediate key that is in turn protected by the password or data protection secret.

Hence, the user does not need to recover the actual password or data protection secret. Instead, the user needs to recover the intermediate key or keys that are stored as part of the recovery data.

Figure 3A:
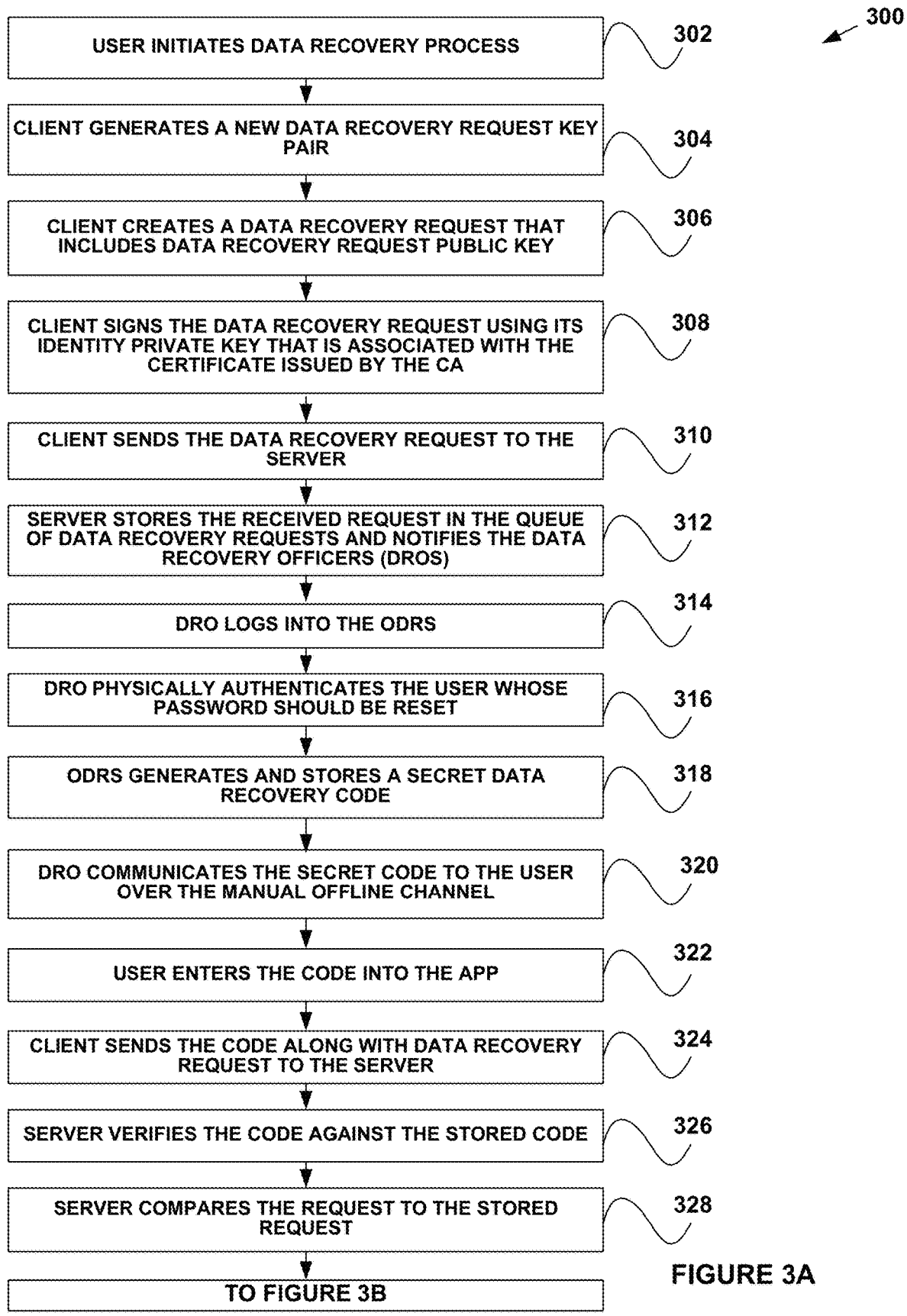
FIGS. 3A-3B shows a system flow diagram for sensitive data recovery in high security systems, in accordance with one embodiment.
Figure 3B:
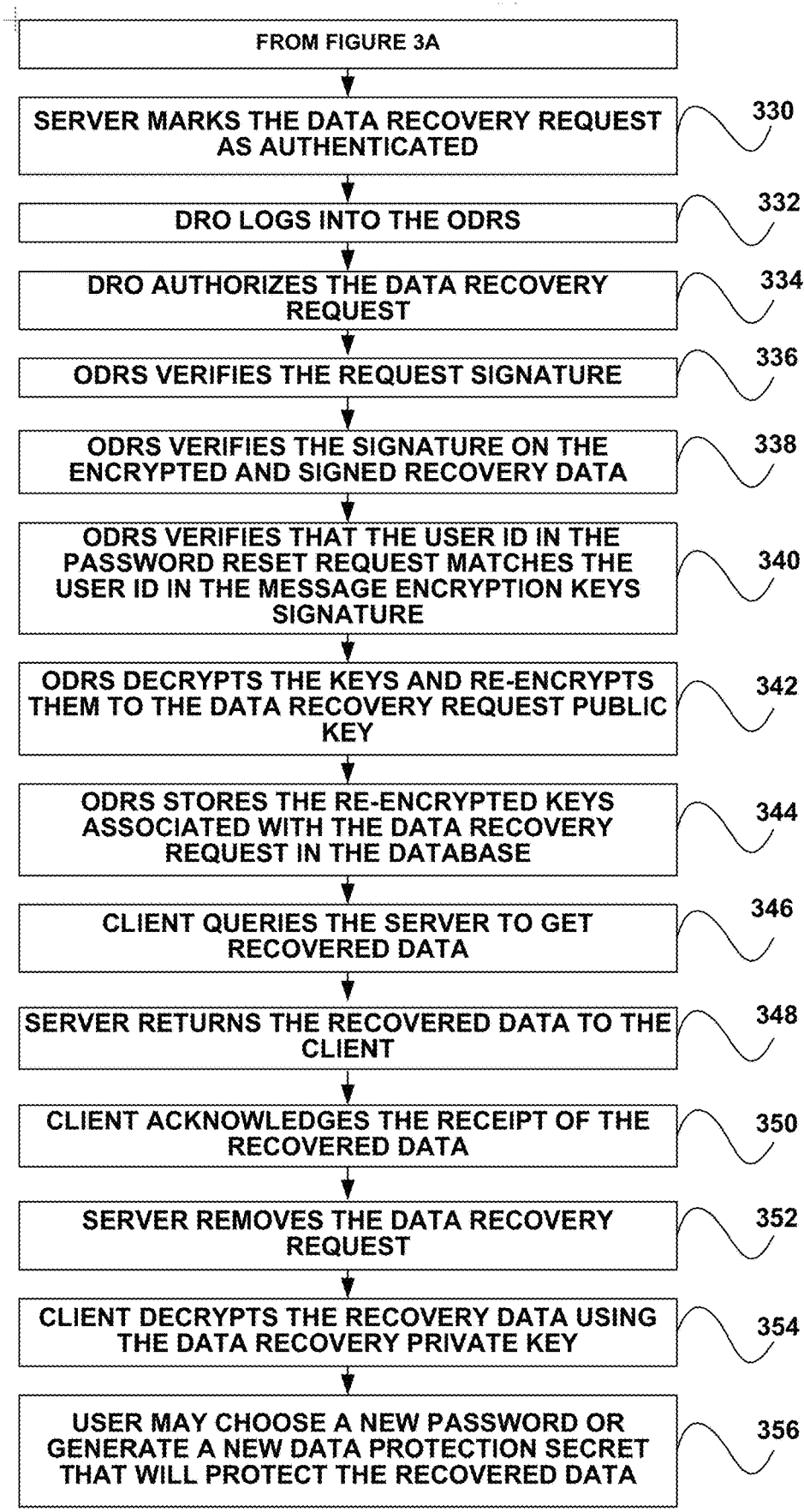

FIGS. 3A-3B show a system flow diagram 300 illustrating steps for sensitive data recovery in high security systems, in accordance with another embodiment. As an option, the system flow diagram 300 may be carried out in the context of any of the previously described figures. Of course, however, the system flow diagram 300 may be carried out in any desired context. It should also be noted that the aforementioned definitions may apply during the present description.

In operation, a user initiates a data recovery process. See operation 302. A client device generates a new data recovery request key pair. See operation 304.

The client device creates a data recovery request that includes a data recovery request public key. See operation 306. The client device signs the data recovery request using its identity private key that is associated with the certificate issued by the CA. See operation 308.

The client device sends the data recovery request to the server. See operation 310. The server stores the received request in the queue of data recovery requests and notifies the data recovery officers (DROs). See operation 312.

The DRO logs into the ODRS. See operation 314. The DRO may physically authenticate the user whose password should be reset (e.g. over phone, over email, by physically checking the user's passport, etc.). See operation 316. This part of the process (operations 312-316) may be alternatively automated (e.g. sending automated email, SMS, automated phone call, etc.).

The ODRS generates and stores a secret data recovery code. See operation 318. The DRO communicates the secret code to the user over the manual offline channel. See operation 320.

The user enters the code into the application. See operation 322. The client device sends the code along with data recovery request to the server. See operation 324. This communication should be encrypted (e.g. by using mutually authenticated TLS, etc.).

The server verifies the code against the stored code. See operation 326. The server compares the request to the stored request (in particular, the server compares the request public key provided with the code to the stored request public key). See operation 328.

The server marks the data recovery request as authenticated. See operation 330. The DRO logs into the ODRS (if not logged in yet). See operation 332.

The DRO authorizes the data recovery request (it is already authenticated). See operation 334. The ODRS verifies the request signature. See operation 336.

The ODRS verifies the signature on the encrypted and signed recovery data. See operation 338. The ODRS verifies that the user ID in the password reset request matches the user ID in the message encryption keys signature. See operation 340.

The ODRS decrypts the keys and re-encrypts them to the data recovery request public key. See operation 342. The ODRS stores the re-encrypted keys associated with the data recovery request in the database. See operation 344.

The client device queries the server to get the recovered data. See operation 346. The server returns the recovered data to the client. See operation 348.

The client device acknowledges the receipt of the recovered data. See operation 350. The server removes the data recovery request. See operation 352.

The client device decrypts the recovery data using the data recovery private key. See operation 354. At this point, the user may choose a new password or generate a new data protection secret that will protect the recovered data. See operation 356.

In one embodiment, the ODRS could also leverage a hardware security module (HSM), a smart card, or another tamper-proof physically protected (possibly hardware-backed) trusted execution environment. The HSM or smart card may execute operations 336-342 inside the trusted execution environment as part of trustlet/applet. When the DRO officer logs in, the officer may unlock the locked HSM/smart card key partition by entering partition password or a PIN.

By utilizing the solution described herein, sensitive data may be still recovered, but sensitive data cannot be compromised even if the server is compromised. The system leverages the offline data recovery system that may rely on physical, hardware, and software security hardening techniques to protect the data recovery process.

The system allows for recovering of data protected by a user's password when the password is lost. The system utilizes an offline physically secure facility (e.g. secure room with HSM, etc.) that releases re-encrypted recovery data. Recovery data is never released outside of offline secure facilities in clear text so recovery data cannot be compromised even if the online server is compromised. The offline system also matches the request signature to the recovery data signature. To compromise the system, and attacker needs to compromise the offline secure system, compromise the PKI, and circumvent additional user authentication checks.

Figure 4:
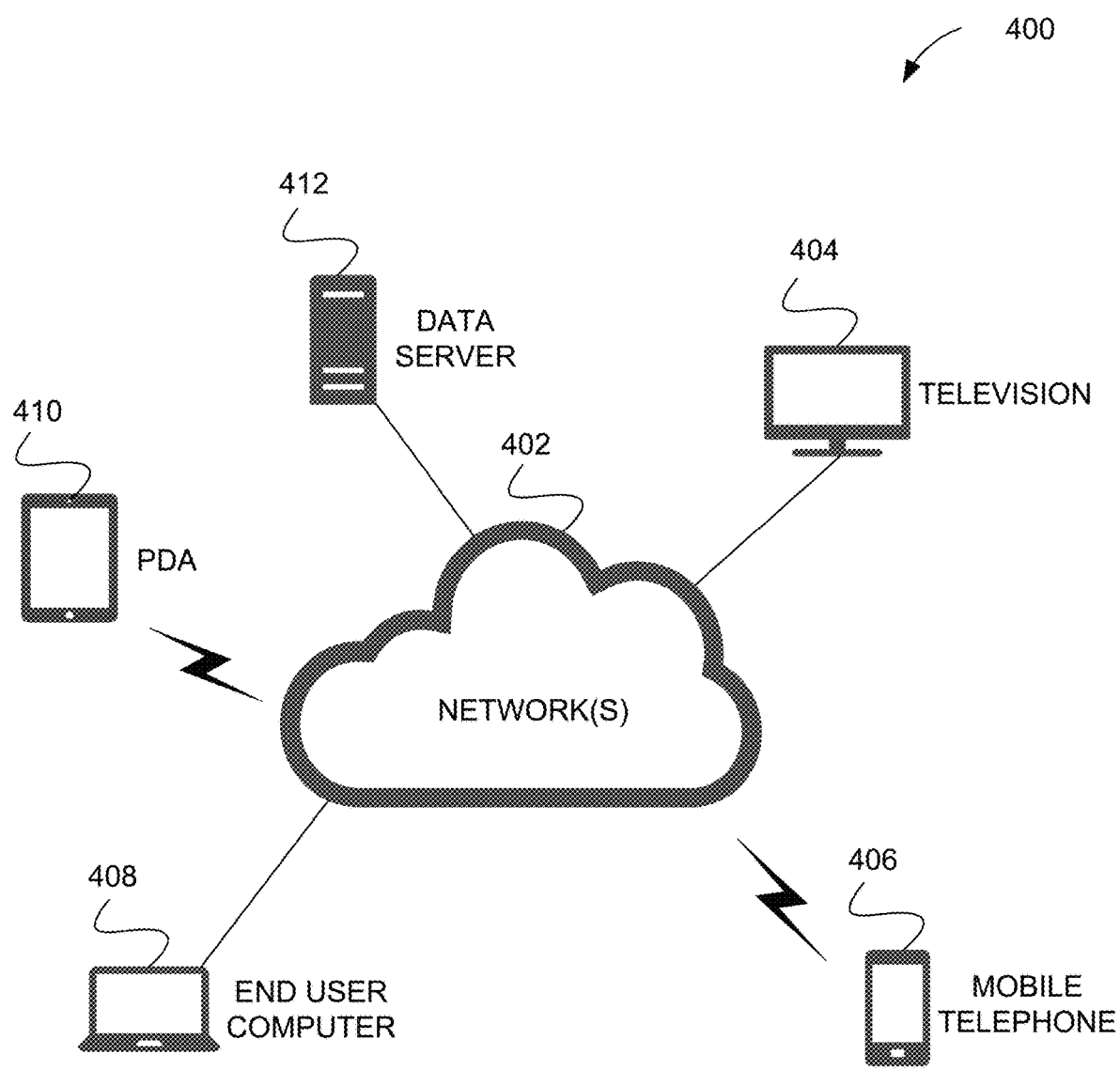
FIG. 4 illustrates a network architecture, in accordance with one embodiment.

FIG. 4 illustrates a network architecture 400, in accordance with one embodiment. As shown, at least one network 402 is provided. In various embodiments, any one or more components/features set forth during the description of any previous figure(s) may be implemented in connection with any one or more of the components of the at least one network 402.

In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 412 and an end user computer 408 may be coupled to the network 402 for communication purposes. Such end user computer 408 may include a desktop computer, lap-top computer, and/or any other type of logic. Still yet, various other devices may be coupled to the network 402 including a personal digital assistant (PDA) device 410, a mobile phone device 406, a television 404, etc.

Figure 5:
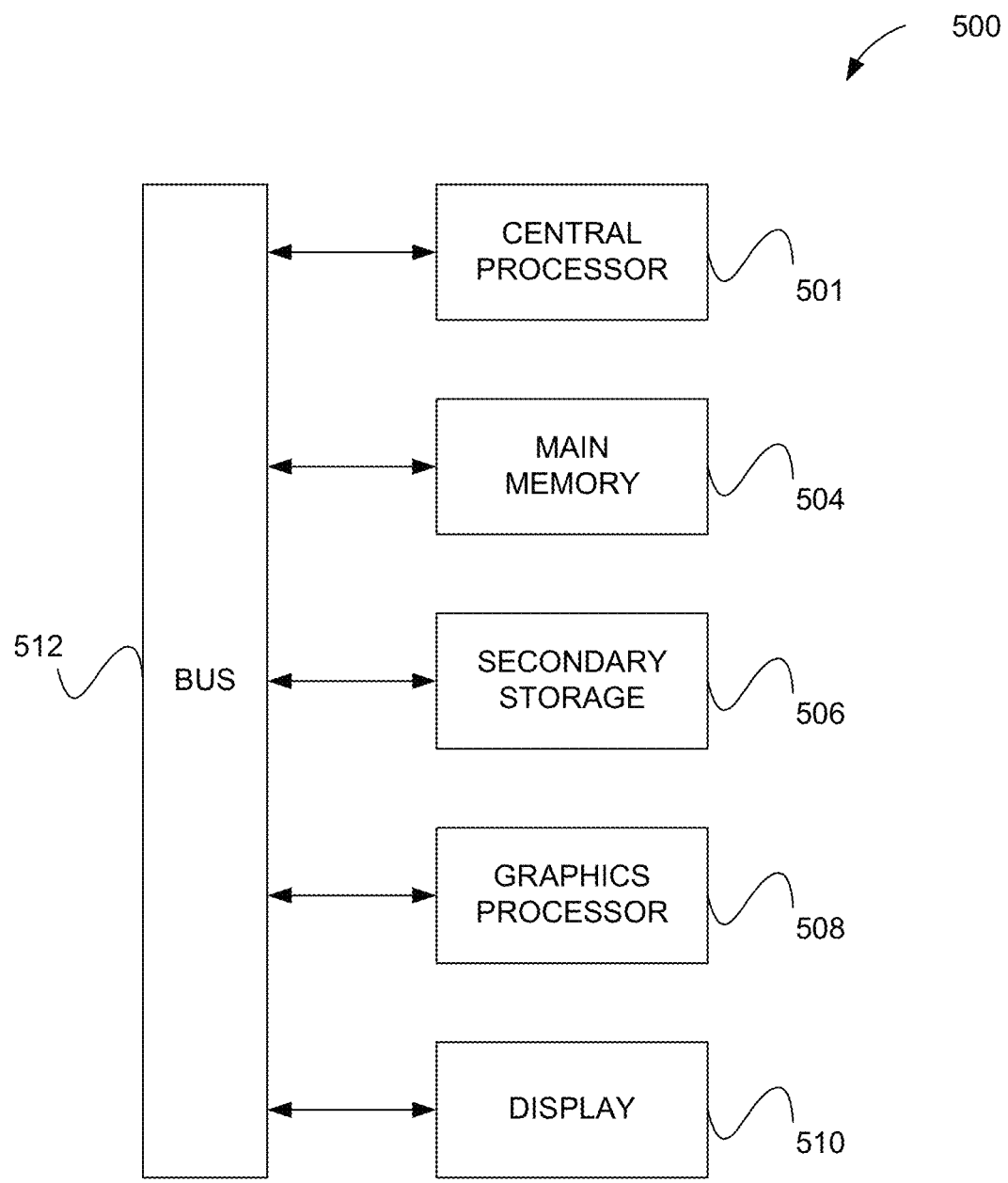
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 400 of FIG. 4. However, it is to be appreciated that the system 500 may be implemented in any desired environment.

As shown, a system 500 is provided including at least one central processor 502 which is connected to a bus 512. The system 500 also includes main memory 504 [e.g., hard disk drive, solid state drive, random access memory (RAM), etc.]. The system 500 also includes a graphics processor 508 and a display 510.

The system 500 may also include a secondary storage 506. The secondary storage 506 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 504, the secondary storage 506, and/or any other memory, for that matter. Such computer programs, when executed, enable the system 500 to perform various functions (as set forth above, for example). Memory 504, secondary storage 506 and/or any other storage are possible examples of non-transitory computer-readable media.

In one embodiment, means in the form of the processor 502 (and/or different means corresponding to different components thereof) executes instructions in the memory 504 or in the secondary storage 506 (e.g. for each system/device/subsystem, etc.) for: receiving, on a client device, a request by a user to initiate a data recovery process to recover data that is encrypted by a user password or a user secret key; generating, by the client device, a new data recovery request key pair; creating, by the client device, a data recovery request that includes a data recovery request public key; signing, by the client device, the data recovery request using an identity private key that is associated with a certificate issued by a certification authority (CA); sending, by the client device, the data recovery request to a server system storing the data; accessing, by the server system, an offline data recovery subsystem (ODRS) storing a data recovery key pair to authenticate the user; generating and storing, by the ODRS, a secret data recovery code; receiving, by the client device, the secret data recovery code that was communicated to the user; sending, by the client device, the secret data recovery code along with the data recovery request to the server system; verifying, by the server system, the received secret data recovery code against a stored secret data recovery code; verifying, by the server system, a public key associated with the received data recovery request against a public key associated with a stored recovery request; identifying, by the server system, the data recovery request as authenticated; verifying, by the ODRS, a request signature associated with the data recovery request; verifying, by the ODRS, the encrypted signature against encrypted and signed recovery data; verifying, by the ODRS, that a user ID in a password reset request matches a user ID in a message encryption key signature; decrypting, by the ODRS, the data recovery key pair and re-encrypting the data recovery key pair to the data recovery request public key; storing, by the ODRS, the re-encrypted data recovery key pair associated with the data recovery request; querying, by the client device, the server system to obtain the data; returning, by the server system, the data to the client device; and decrypting, by the client device, the data using a data recovery private key.

Optionally, in any of the preceding embodiments, the user may choose a new password utilizing the client device that will protect the data after the data has been recovered.

Optionally, in any of the preceding embodiments, the user may generate a new data protection secret utilizing the client device that will protect the data after the data has been recovered.

Optionally, in any of the preceding embodiments, the ODRS may utilize a hardware security module for verifying the request signature associated with the data recovery request.

Optionally, in any of the preceding embodiments, the ODRS may utilize a hardware security module for verifying the encrypted signature against the encrypted and signed recovery data.

Optionally, in any of the preceding embodiments, the ODRS may not be connected to a network.

Optionally, in any of the preceding embodiments, the certificate issued by the certification authority may include a public key infrastructure (PKI) certificate.

It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), and the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein include the one or more modes known to the inventor for carrying out the claimed subject matter. It is to be appreciated that variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A computer implemented method, comprising:
   receiving, on a client device, a request by a user to initiate a data recovery process to recover data that is encrypted;
   generating, by the client device, a new data recovery request key pair;
   creating, by the client device, a data recovery request that includes a data recovery request public key;
   signing, by the client device, the data recovery request using an identity private key that is associated with a certificate issued by a certification authority (CA);
   sending, by the client device, the data recovery request to a server system storing the data;
   accessing, by the server system, an offline data recovery subsystem (ODRS) storing a data recovery key pair to authenticate the user;
   generating and storing, by the ODRS, a secret data recovery code, wherein the secret data recovery code is communicated to the user;
   receiving, by the client device, the secret data recovery code that was communicated to the user;
   sending, by the client device, the secret data recovery code along with the data recovery request to the server system;
   verifying, by the server system, the received secret data recovery code against the generated and stored secret data recovery code;
   verifying, by the server system, a public key associated with the received data recovery request against a public key associated with a stored recovery request;
   identifying, by the server system, the data recovery request as authenticated;
   verifying, by the ODRS, a request signature associated with the data recovery request;
   verifying, by the ODRS, an encrypted signature against encrypted and signed recovery data;
   verifying, by the ODRS, that a user ID in a password reset request matches a user ID in a message encryption key signature;
   decrypting, by the ODRS, the data recovery key pair and re-encrypting the data recovery key pair to the data recovery request public key;
   storing, by the ODRS, the re-encrypted data recovery key pair associated with the data recovery request;
   querying, by the client device, the server system to obtain the data;
   returning, by the server system, the data to the client device; and
   decrypting, by the client device, the data using a data recovery private key.

2. The method of claim 1, wherein the user chooses a new password utilizing the client device that will protect the data after the data has been recovered.

3. The method of claim 1, wherein the user generates a new data protection secret utilizing the client device that will protect the data after the data has been recovered.

4. The method of claim 1, wherein the ODRS utilizes a hardware security module for verifying the request signature associated with the data recovery request.

5. The method of claim 1, wherein the ODRS utilizes a hardware security module for verifying the encrypted signature against the encrypted and signed recovery data.

6. The method of claim 1, wherein the ODRS is not connected to a network.

7. The method of claim 1, wherein the certificate issued by the certification authority includes a public key infrastructure (PKI) certificate.

8. A non-transitory computer readable medium storing computer code executable by a processor to perform a method comprising:
   receiving, on a client device, a request by a user to initiate a data recovery process to recover data that is encrypted;
   generating, by the client device, a new data recovery request key pair;
   creating, by the client device, a data recovery request that includes a data recovery request public key;
   signing, by the client device, the data recovery request using an identity private key that is associated with a certificate issued by a certification authority (CA);
   sending, by the client device, the data recovery request to a server system storing the data;

accessing, by the server system, an offline data recovery subsystem (ODRS) storing a data recovery key pair to authenticate the user;

generating and storing, by the ODRS, a secret data recovery code, wherein the secret data recovery code is communicated to the user;

receiving, by the client device, the secret data recovery code that was communicated to the user;

sending, by the client device, the secret data recovery code along with the data recovery request to the server system;

verifying, by the server system, the received secret data recovery code against the generated and stored secret data recovery code;

verifying, by the server system, a public key associated with the received data recovery request against a public key associated with a stored recovery request;

identifying, by the server system, the data recovery request as authenticated;

verifying, by the ODRS, a request signature associated with the data recovery request;

verifying, by the ODRS, an encrypted signature against encrypted and signed recovery data;

verifying, by the ODRS, that a user ID in a password reset request matches a user ID in a message encryption key signature;

decrypting, by the ODRS, the data recovery key pair and re-encrypting the data recovery key pair to the data recovery request public key;

storing, by the ODRS, the re-encrypted data recovery key pair associated with the data recovery request;

querying, by the client device, the server system to obtain the data;

returning, by the server system, the data to the client device; and decrypting, by the client device, the data using a data recovery private key.

9. The non-transitory computer readable medium of claim 8, wherein the user chooses a new password utilizing the client device that will protect the data after the data has been recovered.

10. The non-transitory computer readable medium of claim 8, wherein the user generates a new data protection secret utilizing the client device that will protect the data after the data has been recovered.

11. The non-transitory computer readable medium of claim 8, wherein the ODRS utilizes a hardware security module for verifying the request signature associated with the data recovery request.

12. The non-transitory computer readable medium of claim 8, wherein the ODRS utilizes a hardware security module for verifying the encrypted signature against the encrypted and signed recovery data.

13. The non-transitory computer readable medium of claim 8, wherein the ODRS is not connected to a network.

14. The non-transitory computer readable medium of claim 8, wherein the certificate issued by the certification authority includes a public key infrastructure (PKI) certificate.

15. A system, comprising processor and memory for:
receiving, on a client device, a request by a user to initiate a data recovery process to recover data that is encrypted;

generating, by the client device, a new data recovery request key pair;

creating, by the client device, a data recovery request that includes a data recovery request public key;

signing, by the client device, the data recovery request using an identity private key that is associated with a certificate issued by a certification authority (CA);

sending, by the client device, the data recovery request to a server system storing the data;

accessing, by the server system, an offline data recovery subsystem (ODRS) storing a data recovery key pair to authenticate the user;

generating and storing, by the ODRS, a secret data recovery code, wherein the secret data recovery code is communicated to the user;

receiving, by the client device, the secret data recovery code that was communicated to the user;

sending, by the client device, the secret data recovery code along with the data recovery request to the server system;

verifying, by the server system, the received secret data recovery code against the generated and stored secret data recovery code;

verifying, by the server system, a public key associated with the received data recovery request against a public key associated with a stored recovery request;

identifying, by the server system, the data recovery request as authenticated;

verifying, by the ODRS, a request signature associated with the data recovery request;

verifying, by the ODRS, an encrypted signature against encrypted and signed recovery data;

verifying, by the ODRS, that a user ID in a password reset request matches a user ID in a message encryption key signature;

decrypting, by the ODRS, the data recovery key pair and re-encrypting the data recovery key pair to the data recovery request public key;

storing, by the ODRS, the re-encrypted data recovery key pair associated with the data recovery request;

querying, by the client device, the server system to obtain the data;

returning, by the server system, the data to the client device; and decrypting, by the client device, the data using a data recovery private key.

16. The system of claim 15, wherein the user chooses a new password utilizing the client device that will protect the data after the data has been recovered.

17. The system of claim 15, wherein the user generates a new data protection secret utilizing the client device that will protect the data after the data has been recovered.

18. The system of claim 15, wherein the ODRS utilizes a hardware security module for verifying the request signature associated with the data recovery request.

19. The system of claim 15, wherein the ODRS utilizes a hardware security module for verifying the encrypted signature against the encrypted and signed recovery data.

20. The system of claim 15, wherein the ODRS is not connected to a network.

* * * * *

UNITED STATES PATENT AND TRADEMARK OFFICE
CERTIFICATE OF CORRECTION

| | | |
|---|---|---|
| PATENT NO. | : 11,044,105 B2 | Page 1 of 1 |
| APPLICATION NO. | : 16/352482 | |
| DATED | : June 22, 2021 | |
| INVENTOR(S) | : Michael Matovsky et al. | |

It is certified that error appears in the above-identified patent and that said Letters Patent is hereby corrected as shown below:

In the Claims

Column 11, Line 60, in Claim 15, please replace "comprising processor" with --comprising a processor--.

Signed and Sealed this
Ninth Day of November, 2021

Drew Hirshfeld
*Performing the Functions and Duties of the*
*Under Secretary of Commerce for Intellectual Property and*
*Director of the United States Patent and Trademark Office*